(12) United States Patent
Lee et al.

(10) Patent No.: US 8,048,573 B2
(45) Date of Patent: Nov. 1, 2011

(54) ORGANIC ELECTROLYTIC SOLUTION AND LITHIUM BATTERY USING THE SAME

(75) Inventors: Seok-soo Lee, Yongin-si (KR); Young-gyoon Ryu, Yongin-si (KR); Han-su Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1132 days.

(21) Appl. No.: 11/653,658

(22) Filed: Jan. 12, 2007

(65) Prior Publication Data

US 2007/0275306 A1 Nov. 29, 2007

(30) Foreign Application Priority Data

May 26, 2006 (KR) .................. 10-2006-0047543

(51) Int. Cl.
*H01M 6/16* (2006.01)

(52) U.S. Cl. ........ 429/330; 429/329; 429/331; 429/332; 429/337; 429/338; 429/199; 429/200; 252/62.2

(58) Field of Classification Search ............ 429/330, 429/329, 331, 332, 337, 338, 199, 200; 252/62.2
See application file for complete search history.

(56) References Cited

U.S. PATENT DOCUMENTS

| | | | |
|---|---|---|---|
| 5,296,319 A | 3/1994 | Bito et al. | |
| 5,352,548 A | 10/1994 | Fujimoto et al. | |
| 5,712,059 A | 1/1998 | Barker et al. | |
| 5,714,281 A | 2/1998 | Naruse et al. | |
| 7,115,340 B2 * | 10/2006 | Mori | 429/330 |
| 2003/0148191 A1 | 8/2003 | Mori | |

FOREIGN PATENT DOCUMENTS

| | | |
|---|---|---|
| CN | 1231990 C | 12/2005 |
| JP | 05-082168 | 4/1993 |
| JP | 2001-035530 | 2/2001 |
| JP | 2001-057236 | 2/2001 |
| JP | 2002-025608 | 1/2002 |
| JP | 2001-035530 * | 2/2010 |
| KR | 10-2003-0061218 | 7/2003 |
| KR | 10-2004-0020633 A | 3/2004 |

OTHER PUBLICATIONS

Chinese Registration Determination Certificate dated Aug. 5, 2009, for corresponding Chinese application 200710002167.1 noting listed references in this IDS, as well as CN 1231990, previously filed in an IDS dated Dec. 18, 2008.

Chinese Office action dated Sep. 19, 2008, for corresponding China application 200710021671, with English translation indicating relevance of listed references in this IDS.

* cited by examiner

*Primary Examiner* — Laura S Weiner (74) *Attorney, Agent, or Firm* — Christie, Parker & Hale, LLP (57) ABSTRACT

Organic electrolytic solutions and lithium batteries using the organic electrolytic solutions are provided. One organic electrolytic solution includes a lithium salt, a mixed organic solvent consisting of a high-dielectric constant solvent and a low-boiling point solvent, and a compound represented by Formula 1 or 2 as an additive. The organic electrolytic solution and the lithium battery using the organic electrolytic solution may inhibit the reductive cleavage reaction of a polar solvent, thereby increasing capacity retention of the battery, and improving charge-discharge efficiency and battery lifetime.

16 Claims, 3 Drawing Sheets

ORGANIC ELECTROLYTIC SOLUTION AND LITHIUM BATTERY USING THE SAME

CROSS-REFERENCE TO RELATED PATENT APPLICATION

This application claims priority to and the benefit of Korean Patent Application No. 10-2006-0047543, filed on May 26, 2006 in the Korean Intellectual Property Office, the entire content of which is incorporated herein by reference.

BACKGROUND OF THE INVENTION

1. Field of the Invention

The present invention relates to organic electrolytic solutions and to lithium batteries.

2. Description of the Related Art

As portable electronic devices such as camcorders, cellular phones, notebook PCs, etc. become lighter and more functional, considerable research is being conducted into batteries used as driving sources for the devices. Rechargeable lithium secondary batteries have energy densities per unit weight about three times greater than conventional lead batteries, nickel-cadmium batteries, nickel-hydrogen batteries, nickel-zinc batteries, etc. In addition, lithium rechargeable batteries can be rapidly charged. Accordingly, much research is directed at lithium rechargeable batteries.

Conventional aqueous electrolytic solutions are not usually suitable for lithium batteries because lithium anodes react vigorously with aqueous electrolytic solutions at high operation voltages. For this reason, organic electrolytic solutions prepared by dissolving lithium salts in organic solvents are used in lithium batteries. A good organic solvent has high ion conductivity, a high dielectric constant and low viscosity. However, it is very difficult to obtain a single solvent having all of these characteristics. As a result, mixed solvent systems have been used in lithium batteries. One such system includes an organic solvent having a high dielectric constant and an organic solvent having a low dielectric constant. Another system includes an organic solvent having a high dielectric constant and an organic solvent having low viscosity.

When polar, non-aqueous carbonate solvents are used in lithium secondary batteries, the carbon in the anodes reacts with the electrolytic solutions at initial charging and excess charge is used. Due to this irreversible reaction, passivation layers, such as solid electrolyte interface (SEI) films, are formed on anode surfaces. The SEI film prevents further decomposition of the electrolytic solution and stabilizes charging/discharging. Further, the SEI film acts as an ion channel, allowing only lithium ions to pass, and prevents organic solvents (which solvate lithium ions) flowing with the lithium ions from being cointercalated into the carbon anode. This prevents a collapse of the anode structure.

However, since high voltages of 4 V or greater are repeatedly applied over the SEI film consisting of only polar solvents and the lithium salt, it is difficult for the SEI film to retain the above functions. Cracks generate in the SEI film and the solvent continues to undergo the reduction reaction. As a result, insoluble salts precipitate on the inner and outer portions of the anode, and gas generates to form cracks in the anode structure, thereby reducing electronic connections. Thus, the internal resistance of the anode increases, thereby reducing the capacity of the battery. Further, due to the decomposition of the solvent, the amount of electrolytes decreases and the electrolytes are exhausted in the battery. Thus, a sufficient amount of the ions cannot be easily transferred. To address these problems, various compounds have been suggested for making the SEI film denser and stronger.

SUMMARY OF THE INVENTION

According to one embodiment of the present invention, an organic electrolytic solution ensures the reliability of the battery.

According to another embodiment, an organic electrolytic solution increase the capacity retention of the battery.

According to another embodiment of the present invention, a lithium battery uses the organic electrolytic solution.

According to another embodiment of the present invention, an organic electrolytic solution comprises a lithium salt, an organic solvent, and a compound represented by Formula 1 or Formula 2.

(1)

(2)

In Formulae 1 and 2, each of X and Y is independently selected from hydrogen atoms, halogen groups, halogenated alkyl groups, alkylcarbonyl groups, alkoxycarbonyl groups, nitro groups, and halogenated benzyl groups. However, both X and Y are not hydrogen atoms.

In one embodiment, the compound represented by Formula 1 may be a compound represented by Formula 3.

(3)

In another embodiment, the compound represented by Formula 2 may be a compound represented by Formula 4.

(4)

According to one embodiment of the present invention, the compound represented by Formula 1 or 2 is present in the organic electrolytic solution in an amount ranging from about 0.1 to about 10% by weight based on the weight of the organic solvent. According to another embodiment, the compound represented by Formula 1 or 2 is present in the organic electrolytic solution in an amount ranging from about 1 to about 3% by weight based on the weight of the organic solvent.

In one embodiment, the concentration of the lithium salt in the organic electrolytic solution ranges from about 0.5 to about 2.0 M.

According to one embodiment of the present invention, the solvent may comprise a high-dielectric constant solvent and a low-boiling point solvent. The high-dielectric constant solvent may be selected from ethylene carbonate, propylene carbonate, butylene carbonate, γ-butyrolactone and combinations thereof. The low-boiling point solvent may be selected from dimethyl carbonate, ethylmethyl carbonate, diethyl carbonate, dipropyl carbonate, dimethoxyethane, diethoxyethane, fatty acid ester derivatives and combinations thereof.

According to another embodiment of the present invention, a lithium battery comprises a cathode, an anode, and the inventive organic electrolytic solution.

BRIEF DESCRIPTION OF THE DRAWINGS

The above and other features and advantages of the present invention will be better understood by reference to the following detailed description when considered in conjunction with the attached drawings in which.

DETAILED DESCRIPTION OF THE INVENTION

According to one embodiment of the present invention, an organic electrolytic solution and a lithium battery using the organic electrolytic solution may inhibit the reductive cleavage reaction of polar solvents, thereby increasing the capacity retention of the battery and improving charge-discharge efficiency and battery lifetime.

In one embodiment of the present invention, an organic electrolytic solution comprises a lithium salt, a mixed organic solvent comprising a high-dielectric constant solvent and a low-boiling point solvent, and a compound represented by Formula 1 or 2.

(1)

(2)

In Formulae 1 and 2, each of X and Y is independently selected from hydrogen atoms, halogen groups, halogenated alkyl groups, alkylcarbonyl groups, alkoxycarbonyl groups, nitro groups, and halogenated benzyl groups. However, both X and Y are not hydrogen atoms.

Principles of operation of the present invention will now be explained to aid understanding of the present invention, but are not intended to restrict or limit the scope of the invention.

The compounds represented by Formulae 1 and 2 receive electrons from an electrode more easily than polar solvent molecules. That is, the compounds represented by Formulae 1 and 2 may be reduced at lower voltages than the polar solvent. Thus, their reduction reaction may start before the polar solvent is reduced by the electrode. The additive compounds represented by Formulae 1 and 2 have a structure in which —C(=O)—O—C(=O)— or —O—C(=O)—O— is connected with a carbon-carbon double bond to form a ring. Electron-attracting functional groups are also connected to the carbon-carbon double bond. The carbon-carbon double bond and the electron-attracting functional groups receive the electrons from a surface of the anode to generate electrochemical reactions.

The carbon-carbon double bond is broken by directly receiving the electrons from the surface of the anode. As a result, a radical of the compound is formed. The radicals react with each other to form a dimeric radical. Such reactions occur in succession to produce a polymer, thereby forming a film on the surface of the anode.

Then, the electron-attracting functional groups connected to the carbon-carbon double bond attract the electrons from the carbon-carbon double bond to aid the formation of the radical. That is, the electron-attracting functional groups have affect the formation of the film on the surface of the anode. Nonlimiting examples of suitable electron-attracting functional groups include halogen groups, halogenated alkyl groups, alkylcarbonyl groups, alkoxycarbonyl groups, nitro groups, and halogenated benzyl groups. In one embodiment, the electron-attracting functional group is a trifluoromethyl group.

The —C(=O)—O—C(=O)— and —O—C(=O)—O— groups have an affinity to lithium ions. During the formation of the SEI film, these groups react with lithium ions and affect the properties of the SEI film. After formation of the SEI film, these groups increase conductivity of the lithium ions on the SEI film.

As a result, while conventional SEI films are formed only by polar organic solvents, the above reactions modify the composition of the SEI film such that the SEI film retains its strength even after long periods of charge-discharge. The strong, modified SEI film may prevent the organic solvent (in which the lithium ions are solvated during the intercalation of the lithium ions) from being introduced into the interior of the anode in a more efficient manner. Thus, the film more efficiently inhibits direct contact between the organic solvent and the anode. This ensures more reversible charge-discharge, thereby allowing the battery to have increased performance for a long time.

In one embodiment, the compound represented by Formula 1 may be a compound represented by Formula 3.

(3)

In another embodiment, the compound represented by Formula 2 may be a compound represented by Formula 4.

(4)

According to one embodiment of the present invention, the compound represented by Formulae 1 or 2 may be present in the organic electrolytic solution in an amount ranging from about 0.1 to about 10% by weight based on the weight of the organic solvent. In another embodiment, the compound represented by Formulae 1 or 2 is present in an amount ranging from about 1 to about 3% by weight based on the weight of the organic solvent. If the amount of the compound represented by Formula 1 or 2 is greater than about 10% by weight, the amount of the effective substance affecting the performance of the battery is too, thereby deteriorating charge-discharge properties. If the amount of the compound represented by Formula 1 or 2 is less than about 0.1% by weight, the desired effects of the present invention cannot be sufficiently achieved.

According to one embodiment of the present invention, the solvent used in the organic electrolytic solution comprises a mixture of a high-dielectric constant solvent and a low-boiling point solvent. The high-dielectric constant solvent may be any such solvent commonly used in the art. Nonlimiting examples of suitable high-dielectric constant solvents include γ-butyrolactone, cyclic carbonates such as ethylene carbonate, propylene carbonate, and butylene carbonate, etc.

The low-boiling point solvent may be any such solvent commonly used in the art. Nonlimiting examples of suitable low-boiling point solvents include dimethoxyethane, diethoxyethane, fatty acid ester derivatives, linear carbonates such as dimethyl carbonate, ethylmethyl carbonate, diethyl carbonate, and dipropyl carbonate, etc.

In one embodiment, the high-dielectric constant solvent and the low-boiling point solvent may be mixed in a volume ratio ranging from about 1:1 to about 1:9. If the volume ratio deviates much from the above range, the discharge capacity and charge-discharge lifetime of the battery may be reduced.

The lithium salt may be any lithium salt commonly used in the art. Nonlimiting examples of suitable lithium salts include $LiClO_4$, $LiCF_3SO_3$, $LiPF_6$, $LiN(CF_3SO_2)$, $LiBF_4$, $LiC(CF_3SO_2)_3$, $LiN(C_2F_5SO_2)_2$ and combinations thereof.

In one embodiment, the concentration of the lithium salt in the organic electrolytic solution may range from about 0.5 to about 2.0 M. If the concentration of the lithium salt is less than about 0.5 M, the conductivity of the organic electrolytic solution decreases and thus, the performance of the solution deteriorates. If the concentration of the lithium salt is greater than about 2.0 M, the viscosity of the organic electrolytic solution increases and thus, mobility of the lithium ions decreases.

Figure 3:
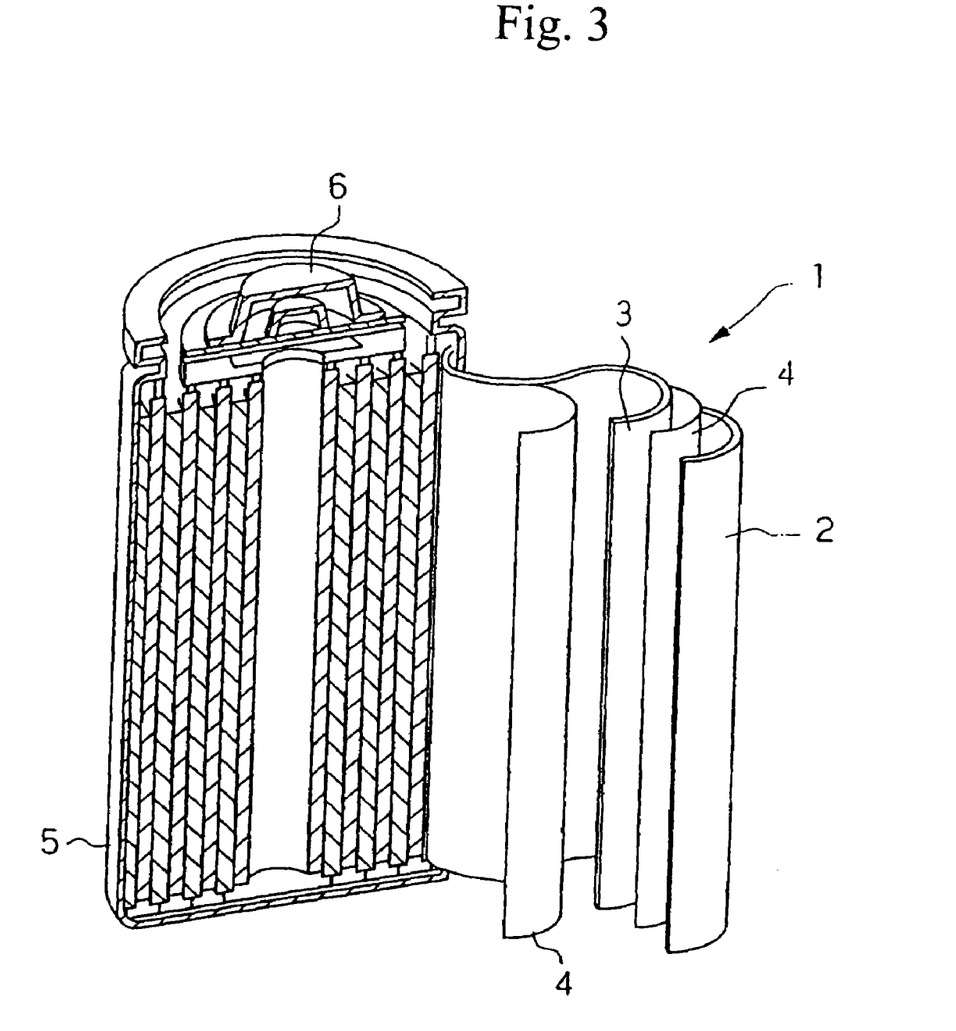
FIG. 3 is a schematic perspective view of a lithium battery according to one embodiment of the present invention.

According to another embodiment of the present invention, as shown in FIG. 3, a lithium battery 1 comprises an electrode assembly including a cathode 2, an anode 2 and a separator 4. The electrode assembly is wound and enclosed in a battery case 5 which is then sealed with a cap assembly 6. The organic electrolytic solution is then injected into the battery case.

The type of lithium battery is not specifically limited. The lithium battery may be, for example, a lithium secondary battery, such as a lithium ion battery, a lithium ion polymer battery, a lithium-sulfur battery, etc., or a lithium primary battery.

According to one embodiment of the present invention, a lithium battery may be prepared as follows. First, a cathode active material composition is prepared by mixing a cathode active material, a conducting material, a binder, and a solvent. The cathode active material composition is coated directly on an aluminium current collector and dried to prepare a cathode plate. Alternatively, the cathode active material composition is cast onto a separate support to form a film which is then peeled from the support and laminated on the aluminium current collector to prepare a cathode plate.

The cathode active material may be any lithium-containing metal oxide commonly used in the art. Nonlimiting examples of suitable cathode active materials include $LiCoO_2$, $LiMn_xO_{2x}$, $LiNi_{x-1}Mn_xO_{2x}$ (where x is 1 or 2), $Ni_{1-x-y}Co_xM-n_yO_2$ ($0 \leq x \leq 0.5$, $0 \leq y \leq 0.5$), etc.

One nonlimiting example of a suitable conductive material is carbon black. Nonlimiting examples of suitable binders include vinylidene fluoride/hexafluoropropylene copolymers, polyvinylidenefluoride, polyacrylonitrile, polymethylmethacrylate, polytetrafluoroethylene and mixtures thereof. The binder may also comprise a styrene butadiene rubber-based polymer. Nonlimiting examples of suitable solvents include N-methylpyrrolidone, acetone, water, etc. The cathode active material, the conducting material, the binder, and the solvent are used in amounts commonly used in lithium batteries.

Similarly, an anode active material composition is prepared by mixing an anode active material, a conducting material, a binder, and a solvent. The anode active material composition is coated directly on a copper current collector to prepare an anode plate. Alternatively, the cathode active material composition is cast onto a separate support to form a film which is then peeled from the support and laminated on the copper current collector to prepare an anode plate. The anode active material, the conducting material, the binder, and the solvent are used in amounts commonly used in lithium batteries.

Nonlimiting examples of suitable anode active materials include silicon metal, thin silicon layers, lithium metal, lithium alloys, carbonaceous materials, and graphite. The conducting material, the binder, and the solvent in the anode active material composition are the same as in the cathode active material composition. If necessary, a plasticizer may be added to the cathode active material composition and the anode active material composition to form pores in the electrode plates.

The lithium battery further comprises a separator, which can be any separator commonly used in lithium batteries. The separator should have low resistance to ion movement of the electrolytes and a good impregnating capacity for the electrolytic solution. Nonlimiting examples of suitable separators include woven and non-woven fabrics of glass fibers, polyester, Teflon, polyethylene, polypropylene, polytetrafluoroethylene (PTFE), and combinations thereof. More specifically, in a lithium ion battery, a separator made of polyethylene, polypropylene, etc. and capable of being wound is used. Further, in a lithium ion polymer battery, a separator having good impregnating capacity for the organic electrolytic solution is used.

According to one embodiment, the separator may be prepared using the following method. First, a separator composition is prepared by mixing a polymer resin, a filling agent, and a solvent. The separator composition is directly coated on a surface of an electrode and dried to form a separator film. Alternatively, the separator composition is cast onto a support and dried to form a film which is then peeled from the support and laminated on an electrode to form a separator film.

The polymer resin may be any such resin capable of bonding to an electrode plate. Nonlimiting examples of suitable polymer resins include vinylidenefluoride/hexafluoropropylene copolymers, polyvinylidenefluoride, polyacrylonitrile, polymethylmethacrylate, and mixtures thereof. In one embodiment, for example, vinylidenefluoride/hexafluoropropylene copolymers having from about 8 to about 25% by weight of hexafluoropropylene may be used.

The separator is positioned between the cathode plate and the anode plate to form a cell structure. The cell structure is wound or folded and then placed in a cylindrical or rectangular battery case. The organic electrolytic solution is then injected into the battery case to complete a lithium ion battery.

Alternatively, the cell structures may be stacked to form a bi-cell structure which is impregnated with the organic electrolytic solution. The resulting product is placed in a pouch which is sealed to form a lithium ion polymer battery.

The present invention will now be described with reference to the following examples. However, these examples are given for illustrative purposes only and are not intended to limit the scope of the invention.

EXAMPLES

Example 1

Preparation of an Electrolytic Solution

1% by weight of trifluoromethyl maleic acid anhydride represented by Formula 3 was added as an additive to a mixed organic solvent consisting of 30% by volume of ethylene carbonate and 70% by volume of diethyl carbonate. $LiPF_6$ as a lithium salt (1.3 M) was added to prepare an organic electrolytic solution.

Example 2

Preparation of an Electrolytic Solution

An organic electrolytic solution was prepared as in Example 1, except that the 2% by weight of the trifluoromethyl maleic acid anhydride was used.

Example 3

Preparation of an Electrolytic Solution

An organic electrolytic solution was prepared as in Example 1, except that 3% by weight of the trifluoromethyl maleic acid anhydride was used.

Comparative Example 1

Preparation of an Electrolytic Solution $LiPF_6$ as a lithium salt (1.3 M) was added to a mixed organic solvent consisting of 30% by volume of ethylene carbonate and 70% by volume of diethyl carbonate to prepare an organic electrolytic solution (without using the additive).

Comparative Example 2

Preparation of an Electrolytic Solution

An organic electrolytic solution was prepared as in Example 1, except that 3% by weight of a maleic acid anhydride represented by Formula 5 below was used instead of the trifluoromethyl maleic acid anhydride.

(5)

Comparative Example 3

Preparation of an Electrolytic Solution

An organic electrolytic solution was prepared as in Example 1, except that 3% by weight of 5,5,5-trifluoro-4-hydroxy-2-pentanoic acid lactone represented by Formula 6 below was used instead of the trifluoromethyl maleic acid anhydride.

(6)

Example 4

Preparation of Lithium Battery (Using a Thin Silicon Layer Anode)

A thin silicon layer was used as an anode. The thin silicon layer was prepared by forming an amorphous silicon layer on a surface of a rolled copper foil (having a thickness of 20 µm) using a radio frequency (RF) sputtering method. The thickness of the thin silicon layer was 0.15 µm.

A lithium electrode as a counter electrode was prepared by roll-pressing metal lithium having a thickness of 100 µm on a copper foil having a thickness of 20 µm. The obtained electrode had a thickness of 120 µm.

The anode, a separator, and the lithium electrode as a counter electrode (each having dimensions of 1×2 cm²) were laminated, and the organic electrolytic solution prepared in Example 1 was used to prepare a pouch cell.

Example 5

Preparation of Lithium Battery (Using a Thin Silicon Layer Anode)

A pouch cell was prepared as in Example 4, except that the organic electrolytic solution prepared according to Example 2 was used.

Example 6

Preparation of Lithium Battery (Using a Thin Silicon Layer Anode)

A pouch cell was prepared as in Example 4, except that the organic electrolytic solution prepared according to Example 3 was used.

Comparative Example 4

Preparation of Lithium Battery (Using a thin Silicon Layer Anode)

A pouch cell was prepared as in Example 4, except that the organic electrolytic solution prepared according to Comparative Example 1 was used.

Comparative Example 5

Preparation of Lithium Battery (Using a Thin Silicon Layer Anode)

A pouch cell was prepared as in Example 4, except that the organic electrolytic solution prepared according to Comparative Example 2 was used.

Comparative Example 6

Preparation of Lithium Battery (Using a Thin Silicon Layer Anode)

A pouch cell was prepared as in Example 4, except that the organic electrolytic solution prepared according to Comparative Example 3 was used.

Experimental Example 1

Test of Cycle Characteristics of Batteries

Figure 1:
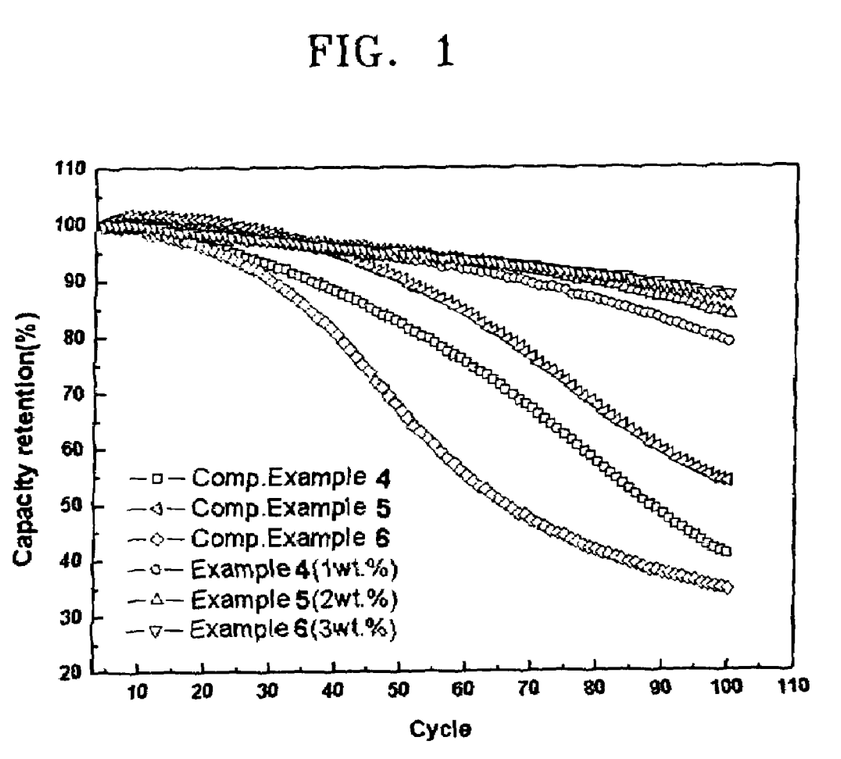
FIG. 1 is a graph of the results of charge/discharge experiments for the batteries prepared according to Examples 4 to 6 and Comparative Examples 4 to 6.

For each of the pouch cells prepared according to Examples 4 to 6 and Comparative Examples 4 to 6, a Li electrode was charged with a constant current of 59 uA per 1 g of active material until the voltage reached 0.01 V. Then, the electrode was charged with a constant voltage of 0.01 V until the current dropped to 5 uA per 1 g of active material. In the first to third charge/discharge cycles, charge/discharge was performed at a rate of 0.2 C to facilitate the formation of an SEI film. From the fourth cycle, the charge/discharge was performed at a rate of 0.5 C. Capacity retention (which is a ratio of capacity at the $100^{th}$ cycle to capacity at the $1^{st}$ cycle) was used as a measure of the cycle characteristics. Capacity retention measurements of the batteries are shown in Table 1 below. FIG. 1 is a graph illustrating the results of the charge/discharge experiments for the batteries prepared according to Examples 4 to 6 and Comparative Examples 4 to 6.

TABLE 1

| | 1st Cycle capacity (mAh/g) | 100th Cycle capacity (mAh/g) | Capacity retention (%) |
|---|---|---|---|
| Example 4 | 2563.0 | 2050.1 | 79.9 |
| Example 5 | 2544.5 | 2133.0 | 83.7 |
| Example 6 | 2491.1 | 2211.0 | 87.6 |
| Comparative Example 4 | 2270.0 | 1013.4 | 44.6 |
| Comparative Example 5 | 2353.5 | 1350.0 | 54.0 |
| Comparative Example 6 | 2326.0 | 875.0 | 34.7 |

As shown in Table 1, the battery prepared according to Comparative Example 4 (in which the additive was not used) had a capacity retention after 100 cycles of about 45%. The battery prepared according to Comparative Example 5 (in which maleic acid anhydride (Formula 5) was used as an additive) had a capacity retention of 54%. The battery prepared according to Comparative Example 6 (in which the compound having a trifluoromethyl group at a position other than the carbon-carbon double bond (Formula 6) was used as an additive) had a capacity retention of about 35%.

However, the batteries prepared according to Examples 4 to 6 had capacity retentions ranging from about 79 to about 88%, indicating improved charge/discharge characteristics. It is believed that the differences in capacity retentions resulted from differences in the degrees of inhibition of side reactions accompanying the charge/discharge, which in turn depends on the structure and components of the SEI film. More specifically, it is believed that when the organic electrolytic solutions according to embodiments of the present invention were used, stronger and denser SEI films were formed, and cracking, etc. of the SEI film was prevented even after long-term charge/discharge. As a result, the reaction between the anode and the solvent was efficiently inhibited, and more reversible charge/discharge reactions occurred.

Example 7

Preparation of a Lithium Battery (a Silicon/Graphite Anode)

A silicon/graphite anode complex was used as an anode material. The anode material was prepared by mixing 1 g of silicon powder having an average particle size of 2 μm and 2 g of graphite powder having an average particle size of 6 μm in a mortar. The mixture was placed into a milling vessel made of stainless steel together with 20 g of steel balls, and the mixture was mechanically milled using a SPEX mill 8000M for 1 hour.

To prepare the anode, first, the silicon/graphite complex, carbon black as a conductive material, and polyvinylidene fluoride (PVDF) as a binder were combined in a weight ratio of 75:15:10 and mixed in a mortar. Then N-methylpyrrolidone (NMP) was added to the mixture to obtain a slurry. The slurry was coated on a copper foil having a thickness of 20 μm, dried at 85° C. and then dried again in vacuum at 120° C. for 3 hours. The obtained anode had a thickness of about 50 μm, which was roll-pressed to a thickness of 45 μm.

A lithium electrode as a counter electrode was prepared by roll-pressing metal lithium having a thickness of 100 μm on a coin cell substrate.

The anode, a separator, and the lithium electrode as a counter electrode (each having dimensions of 1 cm²) were laminated, and the organic electrolytic solution prepared according to Example 3 was used to prepare a coin cell.

Comparative Example 7

A coin cell was prepared as in Example 7, except that the organic electrolytic solution prepared according to Comparative Example 1 was used.

Experimental Example 2

Test of Cycle Characteristics of Batteries

Figure 2:
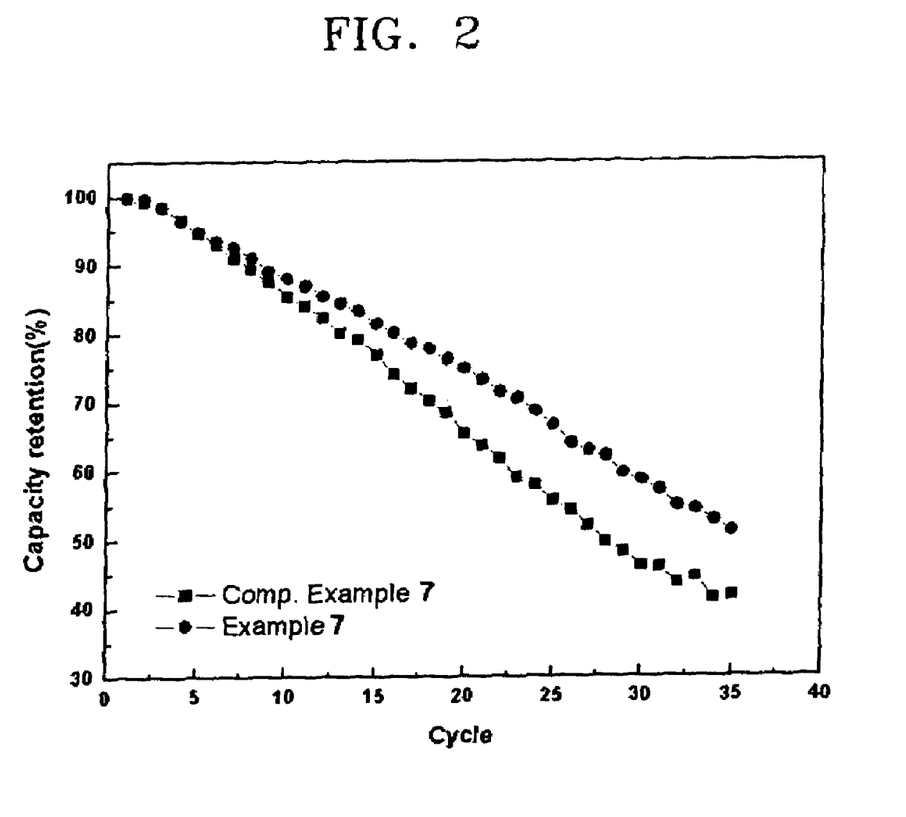
FIG. 2 is a graph of the results of charge/discharge experiments for the batteries prepared according to Example 7 and Comparative Example 7.

For each of the coin cells prepared according to Example 7 and Comparative Example 7, a Li electrode was charged with a current of 100 mA per 1 g of active material until the voltage reached 0.001 V. Then, the electrode was charged with a constant voltage of 0.001 V until the current dropped to 10 mA per 1 g of active material. To estimate the cycle characteristics, charge/discharge was performed at a rate of 0.1 C. Capacity retention (which is the ratio of capacity at the $35^{th}$ cycle to capacity at the $1^{st}$ cycle) was used as a measure of the cycle characteristics. The capacity retention measurements of the batteries are shown in Table 2 below. FIG. 2 is a graph illustrating the results of charge/discharge experiments for the batteries prepared according to Example 7 and Comparative Example 7.

TABLE 2

| | 1st charge (mAh/g) | 1st discharge (mAh/g) | Efficiency (%) | Capacity retention (% @ 35 cycle) |
|---|---|---|---|---|
| Example 7 | 1102.7 | 1695.5 | 65.0 | 51.2 |
| Comparative Example 7 | 1209.7 | 1743.2 | 69.4 | 41.6 |

The organic electrolytic solutions and lithium batteries using the organic electrolytic solutions according to the present invention may inhibit reductive cleavage reactions of polar solvents, thereby increasing capacity retention of the batteries and improving charge-discharge efficiency and battery lifetime.

While the present invention has been illustrated and described with reference to certain exemplary embodiments, it is understood by those of ordinary skill in the art that various modifications and changes to the described embodiments may be made without departing from the spirit and scope of the present invention as defined by the following claims.

What is claimed is:
1. An organic electrolytic solution comprising:
a lithium salt;
an organic solvent; and
a compound represented by Formula 1, (1)

wherein each of X and Y is independently selected from the group consisting of hydrogen atoms, halogen groups, halogenated alkyl groups, alkylcarbonyl groups, alkoxycarbonyl groups, nitro groups, and halogenated benzyl groups, wherein both X and Y are not hydrogen atoms.

2. The organic electrolytic solution of claim 1, wherein the compound represented by Formula 1 is a compound represented by Formula 3:

(3)

3. The organic electrolytic solution of claim 1, wherein the compound represented by Formula 1 is present in an amount ranging from about 0.1 to about 10% by weight based on the weight of the organic solvent.

4. The organic electrolytic solution of claim 1, wherein the compound represented by Formula 1 is present in an amount ranging from about 1 to about 3% by weight based on the weight of the organic solvent.

5. The organic electrolytic solution of claim 1, wherein the concentration of the lithium salt ranges from about 0.5 to about 2.0 M.

6. The organic electrolytic solution of claim 1, wherein the organic solvent comprises a high-dielectric constant solvent and a low-boiling point solvent.

7. The organic electrolytic solution of claim 6, wherein the high-dielectric constant solvent is selected from the group consisting of ethylene carbonate, propylene carbonate, butylene carbonate, γ-butyrolactone and combinations thereof.

8. The organic electrolytic solution of claim 6, wherein the low-boiling point solvent is selected from the group consisting of dimethyl carbonate, ethylmethyl carbonate, diethyl carbonate, dipropyl carbonate, dimethoxyethane, diethoxyethane, fatty acid ester derivatives and combinations thereof.

9. A lithium battery comprising:
a cathode;
an anode; and
an organic electrolytic solution comprising a compound represented by Formula 1, (1)

wherein each of X and Y is independently selected from the group consisting of hydrogen atoms, halogen groups, halogenated alkyl groups, alkylcarbonyl groups, alkoxycarbonyl groups, nitro groups, and halogenated benzyl groups, wherein both X and Y are not hydrogen atoms.

10. The lithium battery of claim 9, wherein the compound represented by Formula 1 is a compound represented by Formula 3:

(3)

11. The lithium battery of claim 9, wherein the compound represented by Formula 1 is present in an amount ranging from about 0.1 to about 10% by weight based on the weight of the organic solvent.

12. The lithium battery of claim 9, wherein the compound represented by Formula 1 is present in an amount ranging from about 1 to about 3% by weight based on the weight of the organic solvent.

13. The lithium battery of claim 9, wherein the concentration of the lithium salt ranges from about 0.5 to about 2.0 M.

14. The lithium battery of claim 9, wherein the organic solvent comprises a high-dielectric constant solvent and a low-boiling point solvent.

15. The lithium battery of claim 14, wherein the high-dielectric constant solvent is selected from the group consisting of ethylene carbonate, propylene carbonate, butylene carbonate, γ-butyrolactone and combinations thereof.

16. The lithium battery of claim 14, wherein the low-boiling point solvent is selected from the group consisting of dimethyl carbonate, ethylmethyl carbonate, diethyl carbonate, dipropyl carbonate, dimethoxyethane, diethoxyethane, fatty acid ester derivatives and combinations thereof.

\* \* \* \* \*